UNITED STATES PATENT OFFICE.

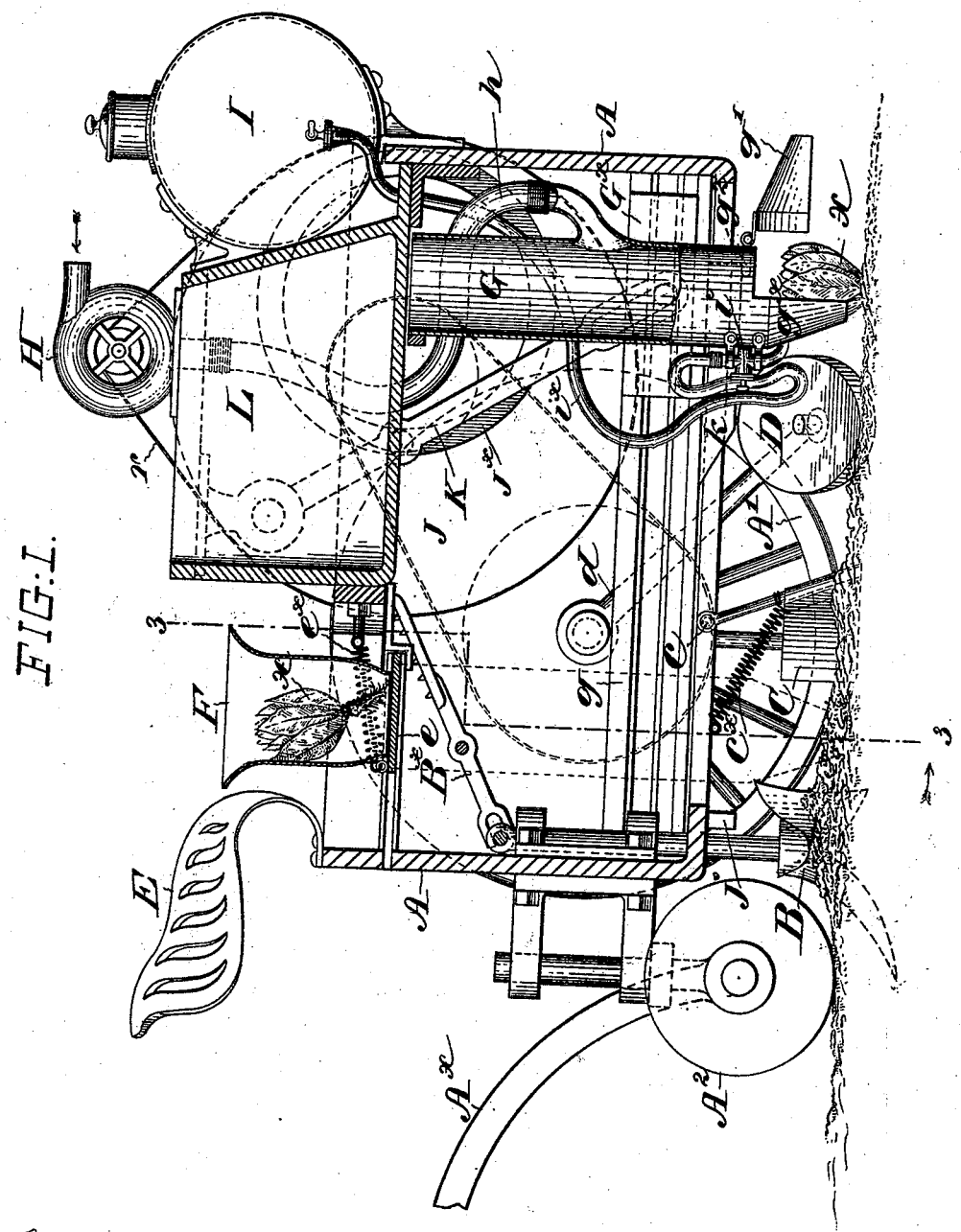

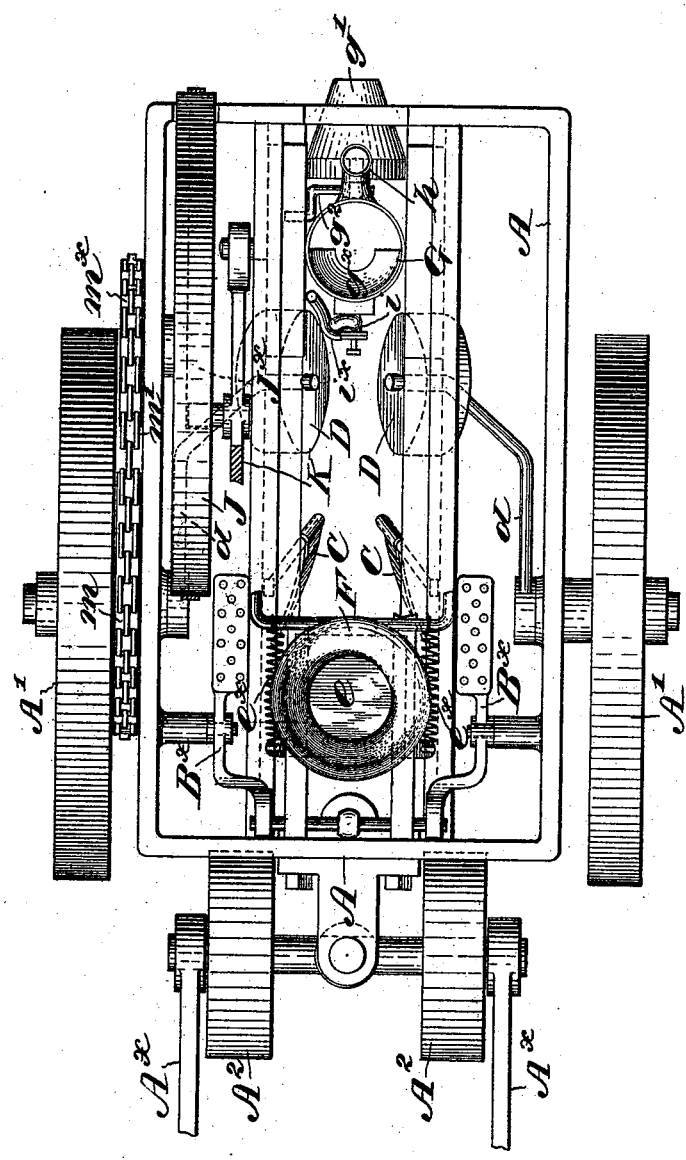

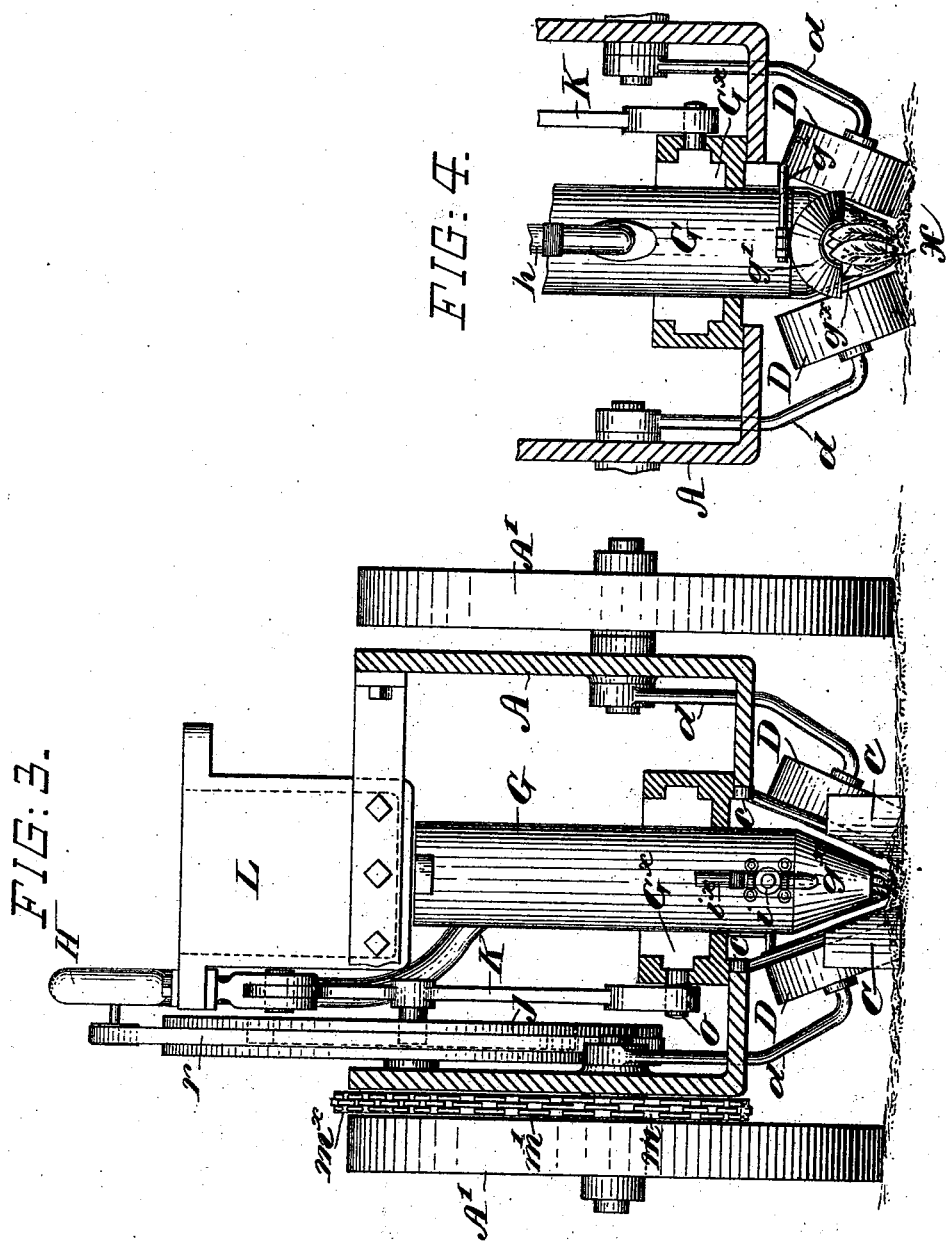

WILLIAM A. PITT, OF MANHASSETT, NEW YORK.

TRANSPLANTER.

SPECIFICATION forming part of Letters Patent No. 516,745, dated March 20, 1894.

Application filed April 29, 1893. Serial No. 472,355. (No model.)

*To all whom it may concern:*

Be it known that I, WILLIAM A. PITT, a citizen of the United States, residing at Manhassett, in the county of Queens and State of New York, have invented certain new and useful Improvements in Machines for Setting Out Plants, of which the following is a specification.

My invention has for its object a machine adapted for setting out plants, and particularly cabbage plants.

The machine is in the nature of a wheeled vehicle, to be drawn by a horse or horses; it is adapted to open a furrow, as it moves along, deliver and hold a plant suspended over the furrow with its roots pendent therein, scrape the soil in about the roots, roll it down firmly, and then release the plant thus set. An auxiliary feature is means provided for throwing a jet of water, or a mixture of lime or fertilizer with water, into the furrow about or on the roots of the plant while it is being set.

One of the characteristic features of the machine consists in providing means for holding the plant stationary with respect to the ground while it is being set, although the vehicle moves on continuously; and another feature is the means employed for delivering the plant after the attendant has dropped it, root first, down into the delivering chute or conduit.

In the accompanying drawings, which serve to illustrate an embodiment of my invention—Figure 1 is a vertical, longitudinal section of the machine showing the moving parts in the position they occupy when a plant has been set and the delivering conduit is on the point of moving forward to receive another plant. Fig. 2 is a plan of the machine with some of the upper parts removed. Fig. 3 is a transverse, vertical section in the plane indicated by the line 3, 3, in Fig. 1. Fig. 4 is a fragmentary end-view of the rear end of the machine.

A represents a suitable frame for carrying the mechanism of the machine, $A^x$ the tongue, pole, or shafts to which the horse or horses are harnessed, $A'$ the ground wheels from which the mechanism is driven, and $A^2$ a pair of bogie or truck wheels in front. These parts constitute the vehicle proper.

Mounted in the front of the frame, just behind the wheels $A^2$, is a furrow opener, B, similar in form to those used on a seed-drill, for opening a furrow to receive the plants. This device is adapted to be raised above the surface of the ground by a treadle lever, $B^x$, so that the machine may be conveniently driven to and from the field. Any of the known means for raising furrow openers may be employed in lieu of that shown.

Back of the furrow opener B, and connected to the frame, are two coverers, C; the purpose of these coverers is to scrape the soil back into the furrow after the plant is set. As here shown these coverers are suspended pivotally to the frame at c, and have each a spring, $c^x$, to hold them up to the work.

Back of the coverers C, are arranged oblique wheels, D, for rolling down and compressing about the plant the soil scraped into the furrow by the coverers. Each of these wheels is rotatively mounted on the free end of an arm, d, hung on the axle of a ground wheel. These wheels D are made by preference of heavy material and are designed to be held down by their weight so as to serve as rollers.

I will now describe the means employed for setting the plant in the furrow. On the frame A, at some suitable point, is a seat, E, for the operator or attendant who feeds the machine, and in front of him is situated a hopper, F, to receive the plant, said hopper having a sliding bottom, e, held closed, normally, by a spring, $e^x$, or equivalent means.

G is the conduit through which the plants, taken into it from the hopper F, at its upper end, are conveyed, one by one, down to the furrow. This conduit is mounted, so as to stand erect, in guides, g, in the frame A, which guides extend from front to rear of the frame. When in its receiving position the conduit G stands directly under the hopper, F, where it receives a plant, as x, from the hopper, and as the vehicle moves forward, drawn by the horse or horses, the conduit is held stationary with respect to the ground until the vehicle has moved on nearly its length, to enable coverers C to pass it and scrape the soil into the furrow about the roots of the plant, and the wheels D to roll and compact it. The conduit G then moves forward again (from the position seen in Fig. 1) to the receiving position. It will be understood that, with respect to the vehicle frame, the conduit has a reciprocating motion in its guides $g$ on the frame, its speed being equal to that at which the vehicle moves forward over the ground, and consequently, in its rearward movement with respect to the vehicle, the conduit will be stationary with respect to the ground over which the vehicle is moving; this is essential in order to hold the plant stationary while it is being set, as will be readily understood. When the conduit G moves forward to the receiving point under the hopper F, it strikes and pushes back the sliding bottom $e$, of the latter, and the attendant drops a plant into the conduit, or he places the plant in the hopper and allows it to drop into the conduit when the bottom is pushed back. The conduit will, of course, be proportioned as nearly as practicable to the size of the plants to be set out, but it may happen that the bushy head of the plant will be broad enough to cause it to stick or lodge in the conduit, and in order to insure the delivery of the plant at the bottom of the conduit, I provide a blower, H, mounted on the frame and driven from a ground wheel, and connected with the conduit by a flexible tube $h$. The jet of air is directed downward and produces a suction in the conduit which will insure against the lodgment of the plant therein. At its bottom the conduit terminates in a cone, $g^x$, whereby only the root and stem of the plant passes out and drops into the furrow below, the bushy head of the plant suspending it in the cone. I may say here that the lower extremity of the conduit may be quite near the normal level of the ground and that said lower end will always be over the furrow. When the conduit moves forward to the receiving point (under the hopper F), a spring-closing compression cock, $i$, thereon will be automatically opened by impingement against some part, $j$ of the frame. This cock controls the flow of liquid from a jet or jets onto the plant and into the furrow, the liquid being led by a flexible tube or hose, $i^x$, from a suitable cask or reservoir, I, mounted on the frame at any convenient point. The liquid may be merely water, or it may be a liquid fertilizer, or lime water. Lime water is found very efficacious with cabbage plants in order to ward off the attacks of insects, and the use of water alone is very important unless the roots of the plants be wet before the attendant drops them into the conduit. Of course the liquid will flow from the jet until the conduit G starts on its rearward movement with respect to the vehicle, when the spring of the cock $i$ will close it. Cocks of this character can be purchased in open market and no detailed description thereof will be needed. Any cock adapted to be opened and closed automatically at the right time will serve the purpose. The plant will be held in the cone $g^x$, by its top until the coverers have scraped the soil into the furrow around it to enable it to stand alone, when the movement of the vehicle with respect to the conduit will open the cone by throwing up the rear half of the latter, as seen in Fig. 1. The cone $g^x$ is in two sections, divided or separated by a vertical transverse slit, so that the rear half or section, $g'$, which is hinged to the conduit, may be thrown up, thus leaving the plant free for the cone to clear it as the vehicle moves on.

The mechanism for throwing up the hinged section of the cone is illustrated in Figs. 1, 2, and 4. On the frame A,—or as here shown, on one of the guides $g$ fixed to the frame,—is a cam-piece, $k$, the forward end of which (see Fig. 1) is inclined or beveled. On the hinge-pin of the cone-section $g'$, is a stud or arm, $g^2$, which stands upright when the cone is closed. As the conduit G moves back with respect to the vehicle, the arm $g^2$ encounters the beveled cam-piece $k$, and this latter turns the hinge pin of the cone-section $g'$, thus swinging the latter out to the horizontal position seen in Fig. 1, and holding it in this position until the conduit, on its return, passes the cam-piece $k$, when the weight of the cone-section will cause it to assume its closed position.

I will now explain the intermediate mechanism whereby one of the ground wheels imparts a reciprocating movement to the conduit G, and also drives the blower H. Mounted rotatively in the frame A, is a cam-disk or wheel, J, which is driven from one of the ground wheels A', through the medium of sprocket wheels, $m$ and $m^x$, on the ground wheel and the shaft of the disk J, respectively, and a chain-belt $m'$. In the face of the cam-disk J, is a cam-groove $J^x$, and pivotally suspended from the upper part of the frame is an arm, K, which has on it a stud, $n$, which engages the cam-groove $J^x$. The form of this groove is such that rotation of the cam-disk will impart a vibrating motion to the arm K. At its free end the arm K has a slot, which is engaged by stud, $o$, on the guide-lock $G^x$ (see Fig. 3) in which the conduit G is fixed. This stud $o$ projects through and plays in a slot in the guide $g$ on that side. The mechanism will be so proportioned that the movement of the conduit G backward with respect to the vehicle will correspond in speed with the movement of the vehicle over the ground. As the cam-groove $J^x$ is constructed in the machine illustrated in Fig. 1, the movement of the conduit forward will be at the same speed as backward, but this is not essential; it may move forward at a greater speed, for example, and may stand stationary for a moment when receiving a plant. All of this will depend on the form of the cam-groove and is within the knowledge of any skilled mechanic. The blower H is driven by a belt, $r$, from the cam-disk J. On the top of the frame A, and forming, substantially, a part of it, is a box L, on which is mounted the blower H, and to which is hung the arm K. In Fig. 1, this box-like portion of the frame, the blower, and the liquid-holder I, are removed to better show the parts below. I contemplate using the box L as a holder for the plants to be set out, and it may contain water to keep the plants fresh. It will be understood that with the construction shown, if the plants are to be set three feet apart, the conduit G will have a movement of eighteen inches, or one half of the distance between the plants.

I do not wish to limit myself to the furrow-opener as a part of the machine, as the furrows might be made by a separate machine and the plants set therein by the machine described. I much prefer, however, to combine the furrow-opener with the machine for setting as there will then be no difficulty in following the furrow. The hopper F, with a sliding bottom, is only a convenience to aid the attendant in placing the plants in the conduit. It would be practicable to dispense with the hopper and its bottom and then the attendant could drop the plant directly into the open upper end of the conduit G.

I prefer to employ rollers D, or some equivalent device for compacting the soil about the plants as the machine moves along, but I do not consider these as absolutely essential parts of the machine. The compacting of the soil may be effected independently of the machine.

The wheels A² might as well be a roller to smooth the ground in front of the furrow-opener.

Any convenient proportions and any suitable materials may be employed in the construction of the machine.

Having thus described my invention, I claim—

1. In a machine for setting out plants, the combination with a vehicle having ground wheels and means for scraping the soil into the furrow about the plants, of the upright conduit G, mounted in guides extending lengthwise of the vehicle, means for moving the conduit to and fro in its guides, the backward movement of the conduit corresponding in speed with the speed at which the vehicle is moving forward, and means substantially as described for disengaging the conduit from the plant set, substantially as set forth.

2. In a machine for setting out plants, the combination with a vehicle having ground wheels and provided with a furrow-opener, and means, behind the furrow-opener, for scraping the soil back into the furrow about the plant, of an upright conduit G to guide the plants to the furrow, guides, in which said conduit is mounted, extending lengthwise of the vehicle frame, means intermediate a ground wheel and said conduit, for imparting to the latter a to and fro motion in its guides at the same speed at which the vehicle is moving, and means for freeing or disengaging the conduit from the plant after the latter has been set, substantially as set forth.

3. In a machine for setting out plants, the combination with a vehicle having ground wheels and means for scraping the soil into the furrow about the plants when set, of a conduit G to guide the plants down to the furrow, guides $g$, extending lengthwise of the vehicle frame, in which guides the conduit is mounted, mechanism between a ground wheel of the vehicle and the conduit whereby the latter is moved to and fro in the guides at a speed equal to that at which the vehicle is moving, means for freeing the conduit from the plant when set, and means, substantially as described for automatically discharging liquid onto the plant and into the furrow at the time the plant is being set, substantially as set forth.

4. In a machine for setting out plants, the combination with a vehicle having ground wheels and provided with longitudinally extending guides $g$, of the conduit G mounted in said guides and provided with a coned extremity, one portion, $g'$, of which is hinged, means intermediate one of the ground wheels and the conduit for imparting a to and fro movement of the conduit in its guides, means for opening the hinged portion $g'$ of the cone of the conduit when the latter moves backward with respect to the vehicle, the hopper F, and its movable bottom $e$, substantially as set forth.

5. In a machine for setting out plants, the combination with a vehicle having ground wheels and provided with guides $g$, of the conduit G, mounted in said guides, means intermediate the conduit and one of the ground wheels for imparting a to and fro motion to the conduit in its guides when the vehicle moves along, a blower, driven from one of the ground wheels, and a flexible tube connecting the outlet of the blower with the conduit, substantially as described, whereby a downwardly directed current of air is set up in the conduit.

6. In a machine for setting out plants, the combination with a vehicle having ground wheels and guides $g$, and the conduit G, mounted in said guides, of the disk J, rotatively mounted in the vehicle frame and having in its face a cam-groove $J^x$, means for driving said disk from one of the ground wheels, and an arm K, pendent from the vehicle frame and having a stud which engages the cam-groove in the disk, said arm having a slot near its free end which is engaged by a stud on the guide-block on the conduit, as set forth.

In witness whereof I have hereunto signed my name in the presence of two subscribing witnesses.

WILLIAM A. PITT.

Witnesses:
HENRY CONNETT,
PETER A. ROSS.